United States Patent [19]

Assh et al.

[11] Patent Number: 4,674,942
[45] Date of Patent: Jun. 23, 1987

[54] LOAD HAULING TANDEM COMBINATION

[76] Inventors: Daniel Assh, 1155 Turnball, #715, Quebec, Canada, G1R 5G3; Saul Assh, 1250 Place Merici, Quebec, Canada, G1S 3H7

[21] Appl. No.: 755,299

[22] Filed: Jul. 15, 1985

[51] Int. Cl.⁴ .............................................. B65G 67/02
[52] U.S. Cl. ..................................... 414/483; 298/8 T; 280/43.23; 280/477; 280/479 R; 414/486; 414/494; 414/495; 414/500; 414/538; 414/555
[58] Field of Search .............. 414/469, 481, 486, 495, 414/498, 500, 482, 483, 494, 538, 571, 555; 280/408, 478 R, 479 R, 414.5, 475, 43.23, 43.24, 704, 477; 180/19.2; 298/8 T

[56] References Cited

U.S. PATENT DOCUMENTS

| | | | |
|---|---|---|---|
| 1,546,261 | 7/1925 | Spencer | 298/8 T |
| 1,749,274 | 3/1930 | Crisler | 298/8 T |
| 2,770,490 | 11/1956 | Hockensmith, Jr. | 298/8 R |
| 2,818,187 | 12/1957 | Cooley | 414/469 |
| 3,074,574 | 1/1963 | Prince | 414/538 X |
| 3,082,039 | 3/1963 | Clement | 298/8 R X |
| 3,120,408 | 2/1964 | Pruss | 298/8 T |
| 3,193,330 | 7/1965 | Hribar, Jr. | 298/8 R |
| 3,290,806 | 12/1966 | Peterson | 180/14.2 |
| 3,482,847 | 12/1969 | Hart | 280/478 R X |
| 3,610,169 | 10/1971 | Shannon | 280/414.5 X |
| 3,783,960 | 1/1974 | Feliz | 180/14.2 |
| 3,831,210 | 8/1974 | Ow | 280/704 X |
| 4,065,153 | 12/1977 | Pringle | 280/704 |
| 4,133,439 | 1/1979 | Goranson | 414/494 |

FOREIGN PATENT DOCUMENTS

| | | | |
|---|---|---|---|
| 692680 | 8/1964 | Canada | 414/528 |
| 547778 | 3/1932 | Fed. Rep. of Germany | 180/14.2 |
| 896592 | 7/1943 | France | 280/475 |
| 95226 | 6/1982 | Japan | 414/495 |

Primary Examiner—Robert J. Spar
Assistant Examiner—Stuart J. Millman
Attorney, Agent, or Firm—Robic, Robic & Associates

[57] ABSTRACT

Load-hauling tandem combination formed of a motor driven truck releasably hitched to a wheel-mounted trailer which is self-propelled and self-steerable when unhitched from the truck. A lifting mechanism is provided on the trailer for mounting and removing a container or the like load box on and from its chassis.

15 Claims, 13 Drawing Figures

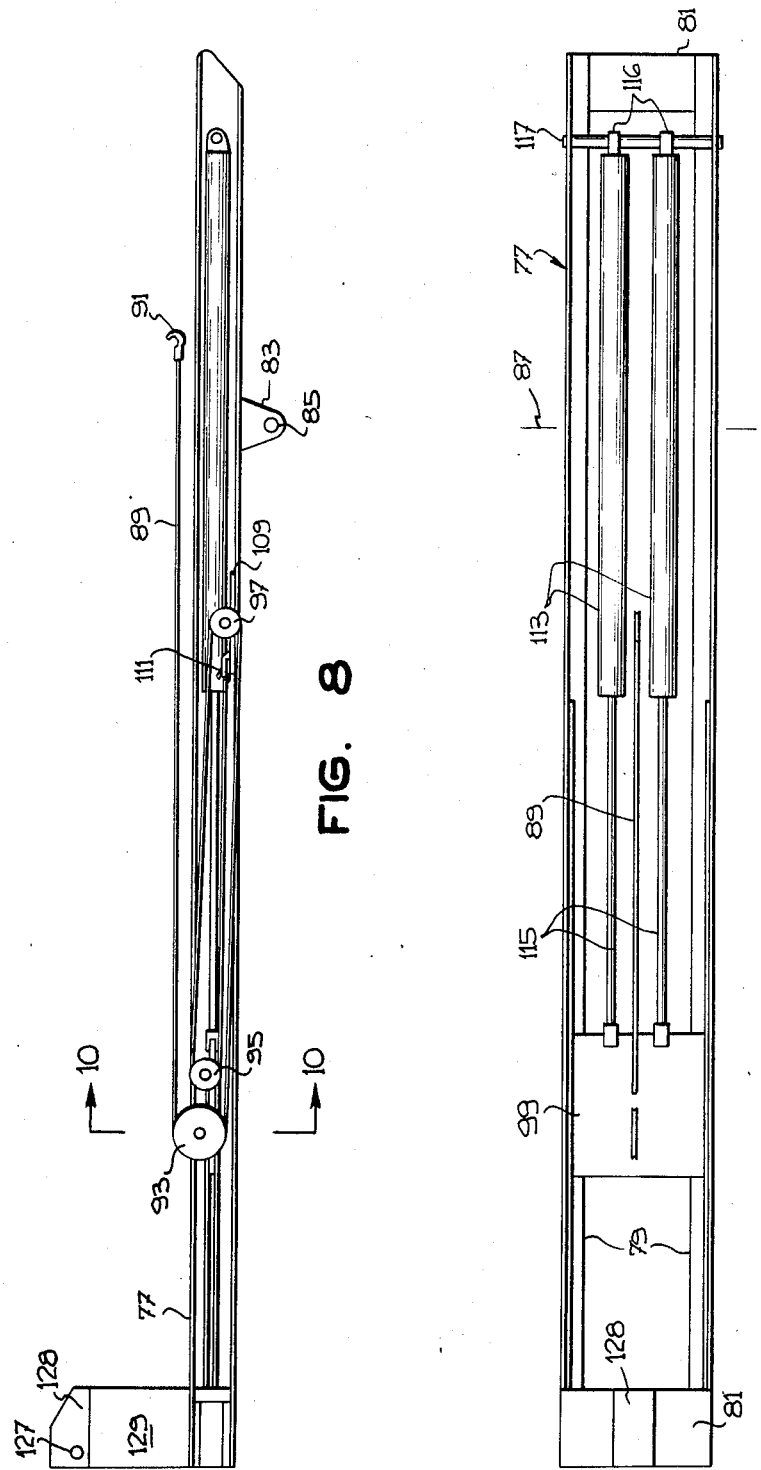

LOAD HAULING TANDEM COMBINATION

BACKGROUND OF THE INVENTION

1. Field of the Invention

The present invention relates to a load hauling tandem combination and more particularly to a motor driven truck to which is hitched a load transporting trailer both especially, although not exclusively, for use in hauling bulk material such as garbage, metal scrap or the like.

2. Objects of the invention.

A main object of the invention is to provide a combination of the above general type wherein not only is the truck motor-driven but the trailer can likewise be motor-driven and steerable, when unhitched from the truck, and be further provided with its own lifting mechanism so that a load box may be mounted on it and removed from it without mechanical help separate from the trailer or truck.

As will be appreciated, this object makes it possible to increase considerably the flexibility, effectiveness and thereby the efficiency of the whole combination. Thus, by being autonomous, the trailer may put down empty material collecting boxes at preselected locations, pick up loaded ones at the same locations and then be hitched to the truck which may then drive to a dump site, the truck having picked up its own load, in the meantime. If, as is mostly the case, the truck is of the tipping lorry type, it can first put down an empty load box and pick up a filled one. The same considerable advantage is available at the dump site where both truck and trailer may be operated separately and simultaneously.

The truck may of course be of the semi-trailer type where a trailer is coupled to the truck by a goose-neck connection. The term <truck> will however be solely used hereinafter for convenience.

SUMMARY OF THE INVENTION

More specifically, an object of the invention lies in the provision of a hauling tandem combination which essentially comprises a motor driven truck and a wheel mounted trailer having a chassis, means being provided on the truck and on the trailer which cooperate to hitch and unhitch the truck and trailer. The trailer is provided, according to the invention with motor means and steering means suitable to allow it, when it is unhitched from the truck, to be driven and steered independently of the truck. The trailer further has a lifting mechanism on its chassis so that a load box may be mounted on it and removed from it.

APPLICANT'S PRIOR ART SEARCH

A search of the prior art was made before the preparation of the present application, which search has revealed the following U.S. Pat. Nos.:

1,546,261—1925—Spencer;
1,749,274—1930—Crisler;
3,082,039—1963—Clement;
3,120,408—1964—Pruss;
3,193,330—1965—Hribar.

It will be noted that the apparatuses of these patents are unable to achieve the important objects aforesaid. More particularly, none shows a tandem combination wherein both the truck and trailer can be independently motor driven and steered, the trailer being further provided with a lifting mechanism for loading and unloading load boxes.

DESCRIPTION OF THE DRAWINGS

Other features, objects and advantages of the invention will become apparent from the description that follows of preferred embodiments, the description referring to the appended drawings wherein:

FIG. 8 is a longitudinal transversal view and FIG. 9 a top plan view of the oscillating platform of FIG. 7, intended to illustrate a pulley block mechanism suitable to draw a load carrying box over the trailer oscillating platform;

DESCRIPTION OF PREFERRED EMBODIMENTS

Figure 1:
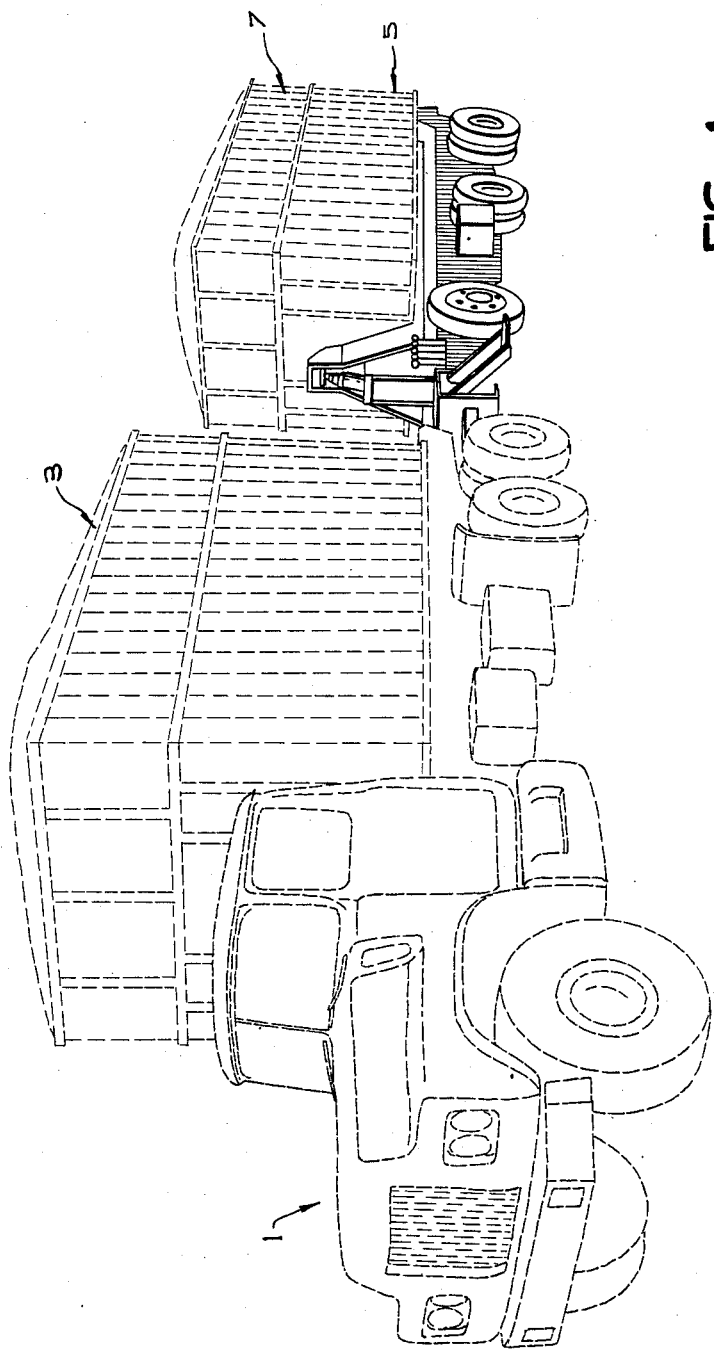
FIG. 1 is a perspective view of a load hauling tandem combination according to the present invention.

FIG. 1 shows a load carrying motor driven truck 1 of conventional type having a tipping load box 3 and to which truck 1 is hitched a trailer 5 likewise provided with a load box 7 which, however, as will be seen hereinafter, can be either of the tipping type or the type that can be moved on and off the trailer 5.

Figure 2:
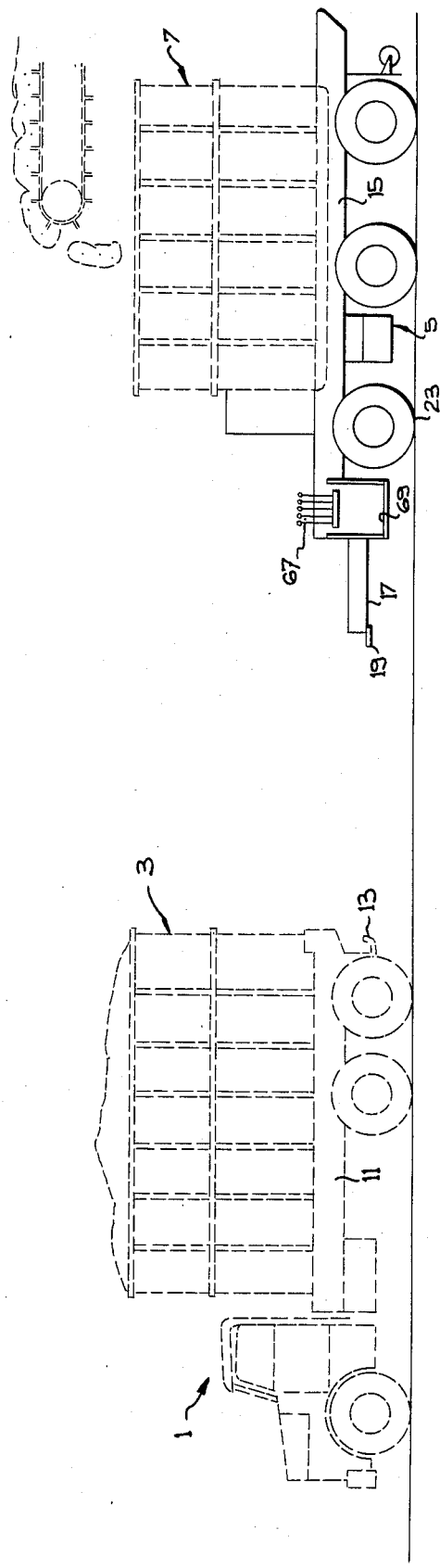
FIGS. 2, 3 and 4 illustrate, in side elevation, three steps in the hitching of the trailer to the truck.
Figure 3:
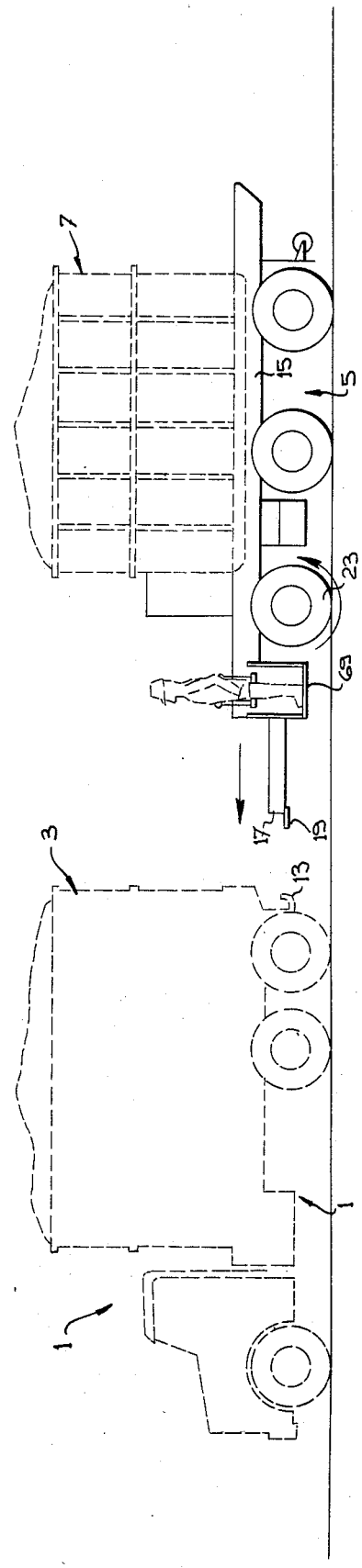
Figure 4:
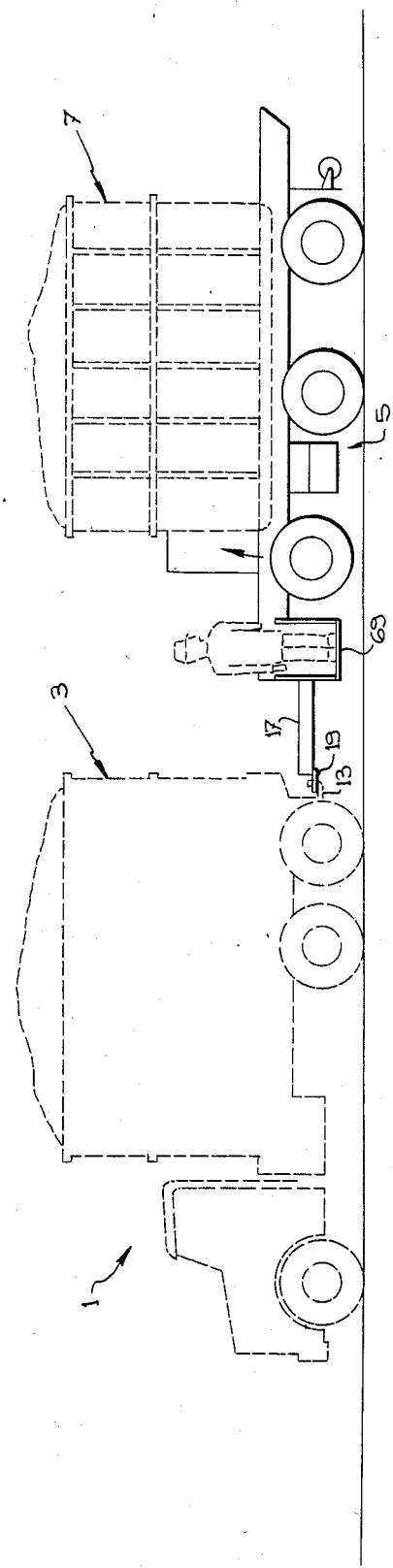

As mentioned previously, the trailer 5 according to the invention is self-propelled, when unhitched, independently of the truck 1. In use, the trailer 5 is approached gradually under its own power toward the truck 1 as shown in FIGS. 2 and 3. Once the trailer 5 is close enough to the truck 1, the front end of the trailer 5 is lifted to allow hitching as shown in FIG. 4. The particular type of hitching mechanism and lifting mechanism for the trailer 5 are described in detail hereinafter. Other types may of course be used.

Figure 5:
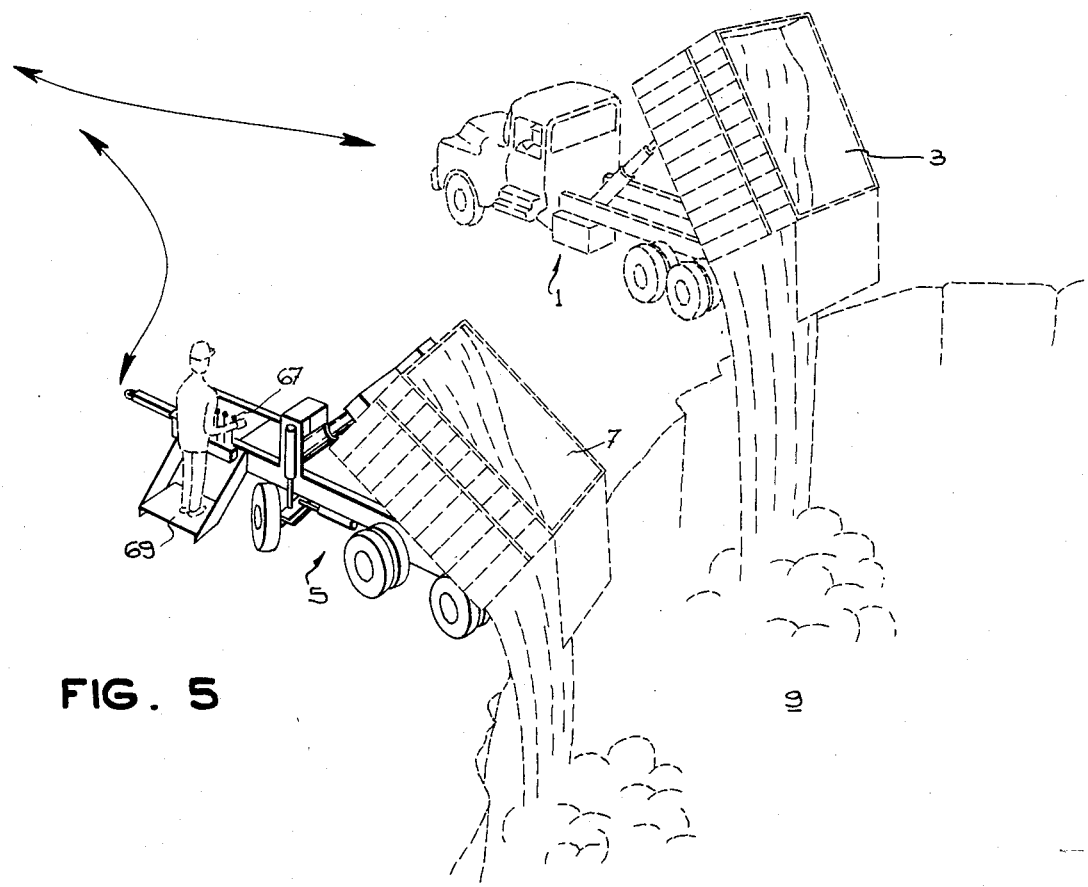
FIG. 5 is a perspective view illustrating the truck and trailer, separated from one another, being unloaded simultaneously.

By being self-propelled, the trailer 5 can be unhitched from the truck 1 and moved under its own power to a suitable location where its load box 7 can be tipped for discharging into a dump 9 as shown in FIG. 5. In this manner, unloading of both the truck 1 and the trailer 5 can be conveniently achieved simultaneously and at appropriately selected locations.

For the above purpose, the truck 7 has a chassis 11 provided at the rear end with a truck hitching member 13 in the form of an upwardly turned hook. The trailer 5 has an appropriately wheel-mounted chassis 15 provided, at the front end, with a draw bar 17 solid with the chassis 15. The forward end of the draw bar 17 terminates into and is solid with a hitching ring 19 which is capable of fitting around the hook 13, as shown in FIG. 4. For this purpose, it will be appreciated that the forward part of the trailer 7 must be raised, the trailer 7 moved toward the truck 3 until the ring 19 comes into registry with the hook 13 and then the forward end of the trailer 5 suitably lowered for hitching engagement of the ring 19 around the hook 13. The truck 1 and trailer 5 are then in tandem formation as shown in FIG. 4.

Figure 6:
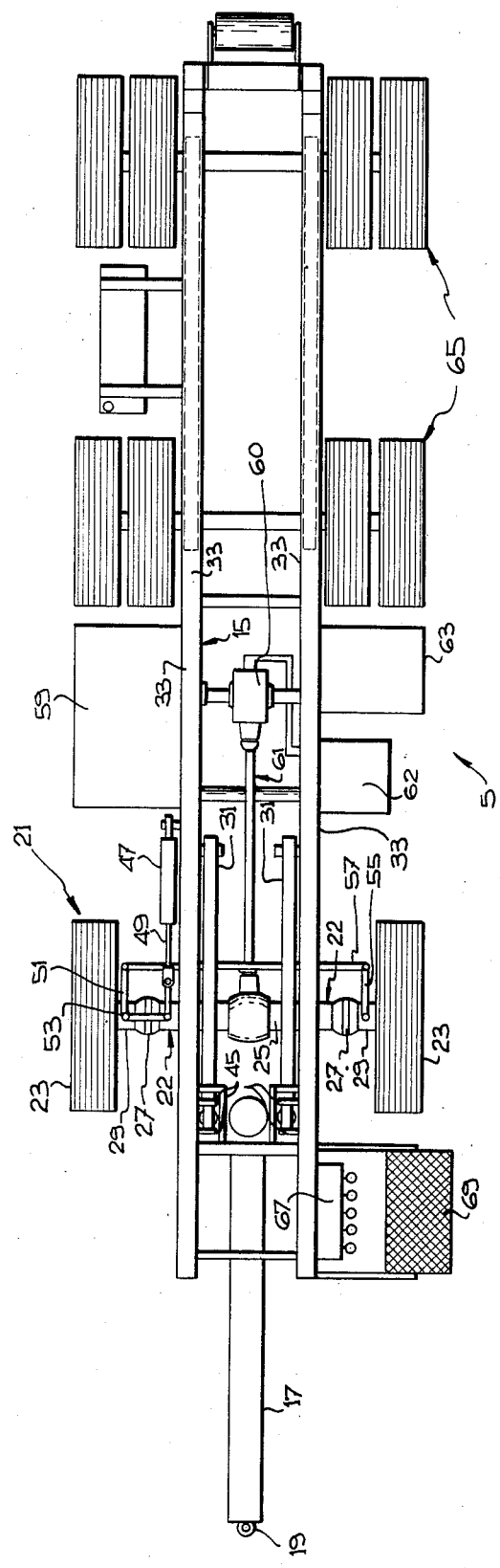
FIG. 6 is a top plan view of the trailer with the load carrying box removed.
Figure 7:
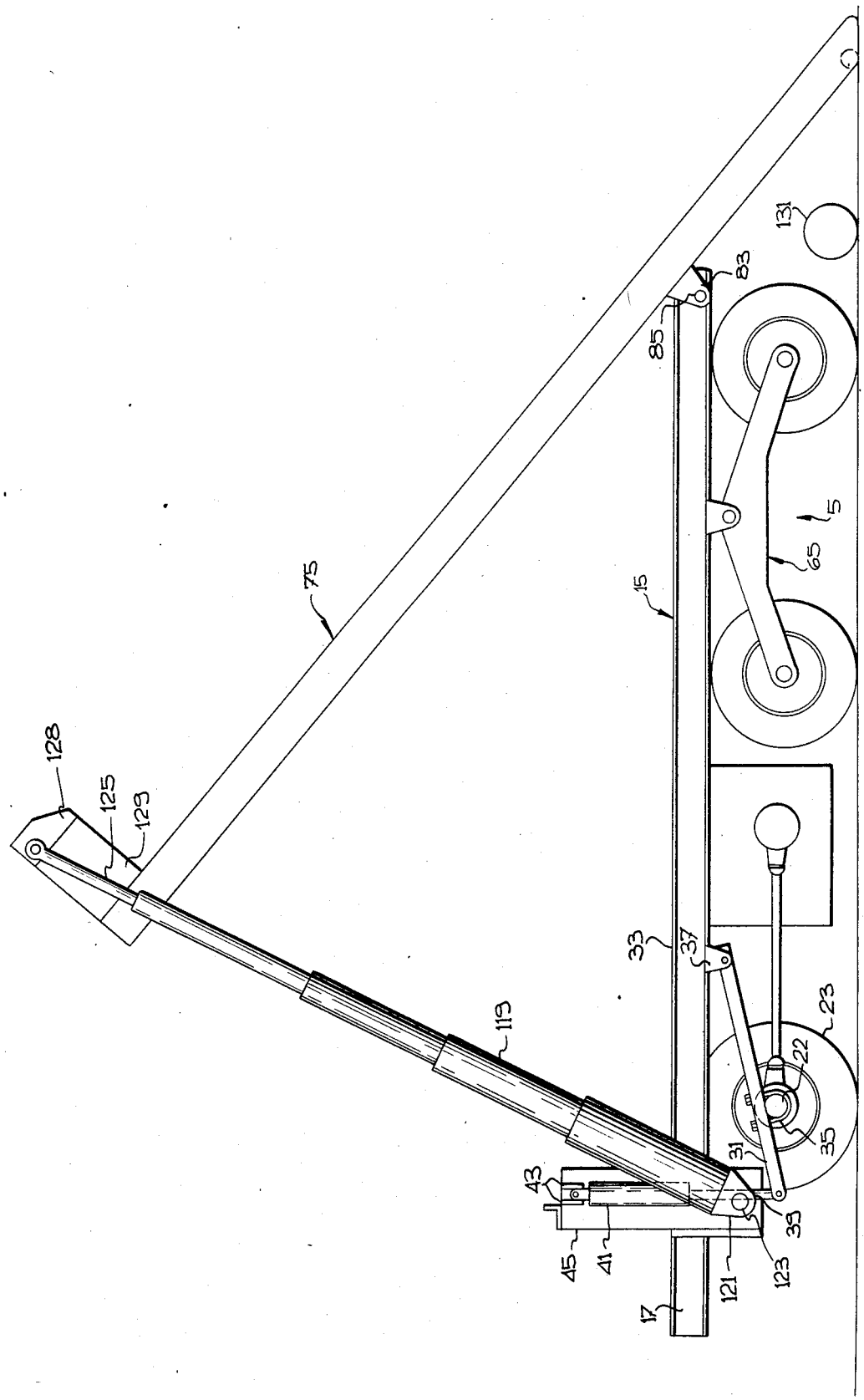
FIG. 7 is a side elevational view of the trailer with the load carrying box removed but showing an oscillating box carrying platform in raised position.

The preferred means or mechanism for vertically displacing the trailer front end to obtain the foregoing hitching engagement is illustrated particularly in FIGS. 6 and 7.

It comprises a forward wheel bogie 21 having an axle structure 22 and a wheel 23 at either end of the axle structure. Since the bogie 21 is of conventional construction, only a very broad description will be given. Thus, the axle construction comprises an outer shaft housing 25, homokinetic or cardan joints 27 extending into shaft stub housings 29 to which the hubs (not shown) of the wheels 23 are secured. The shaft and related components (not shown) to which the wheels 23 are connected lie of course within the axle structure 22.

The axle structure 22 is securely mounted intermediate the ends of a pair of oscillating levers 31 located beneath the chassis 15 of the trailer 5, the levers 31 extending lengthwise of side members 33 of the said trailer chassis 15. Securing the axle structure 22 on the levers 31 may be by means of conventional U-shaped clamps 35 as shown in FIG. 7. The latter figure also illustrates the levers 31 as mounted for oscillation at the rear ends thereof on brackets 37 solid with and depending from the side members 33. The front ends of the levers 31 are pivotally mounted at the lower ends of the rods 39 of hydraulically or pneumatically powered jacks 41 of which the upper ends are pivotally mounted between pairs of ears 43 downwardly projecting from support posts 45 upstanding from the side members 33 of the trailer chassis 15.

In this manner, by extending the power jacks 41, the wheels 23 can be moved into ground engaging driving condition and by further powering the jacks 43, the forward end of the trailer 5 is lifted thereby likewise lifting the drawbar 17 and its ring shaped hitching member 19. Since the trailer 5 is self-propelled, it can be moved toward the rear end of the truck 1 under its own power as shown in FIGS. 2 and 3 until the ring hitching member 19 stands above the hook hitching 13 at which time, the power jacks 41 are deflated to lower the trailer front end and engagement of the ring 19 over the hook 13 which is the situation illustrated in FIG. 4 wherein the truck 1 and trailer 5 are in tandem formation. The wheel bogie 21 is lifted off the ground when the trailer is drawn by the truck and is being used only for self-propulsion.

The steering means aforesaid can be of any conventional type and the one shown in FIG. 6 operates from a hydraulic or pneumatic jack 47 of which one end is pivoted on one of the side members 33 while the other end, that is the outward end of the jack rod 49, is pivotally mounted at the end of one arm of a bell-crank lever 51 the apex 53 of which is fast with the shaft stub housing 29 of the relevant wheel 23. The shaft stub housing 29 of the other wheel 23 has an outwardly directed arm 55 and a straight bar 57 pivotally interconnects the outer free ends of the second arm of the bell crank 51 and the arm 55. Thus, extension of the jack 47 causing outward movement of its rod 49 causes pivoting of the bell crank lever 51, like pivoting of the shaft stub housing 29 and wheel 23 about the respective cardan joint 27. This movement causes transverse shifting of the bar 57 and consequent pivoting of the arm 55, the shaft stub housing 29 to which it is secured and the relevant wheel 23 about the likewise relevant cardan joint 27.

The wheel bogie 21 may be powered by a hydraulic motor 60 actuated by a pump 62 driven by an engine 59; oil being drawn from a tank 63 and the motor 60 being coupled to the axle structure 22 by a standard transmission means 61.

Any conventional wheel bogie assembly 65 may be provided at the rear of the trailer chassis 15. When the trailer is unhitched, the forward wheel bogie 21 will of course be lowered so as to make its wheels 23 ground engaging.

As shown in FIGS. 2, 3, 4 and 6, the various controls for operating the forward wheel bogie 21, either to move it vertically or power and steer it when the wheels 23 are ground engaging, may conveniently be provided on a control board 67 provided at the forward end of the trailer chassis 15 which may also conveniently be provided with a step platform 69 for the operator.

Figure 11:
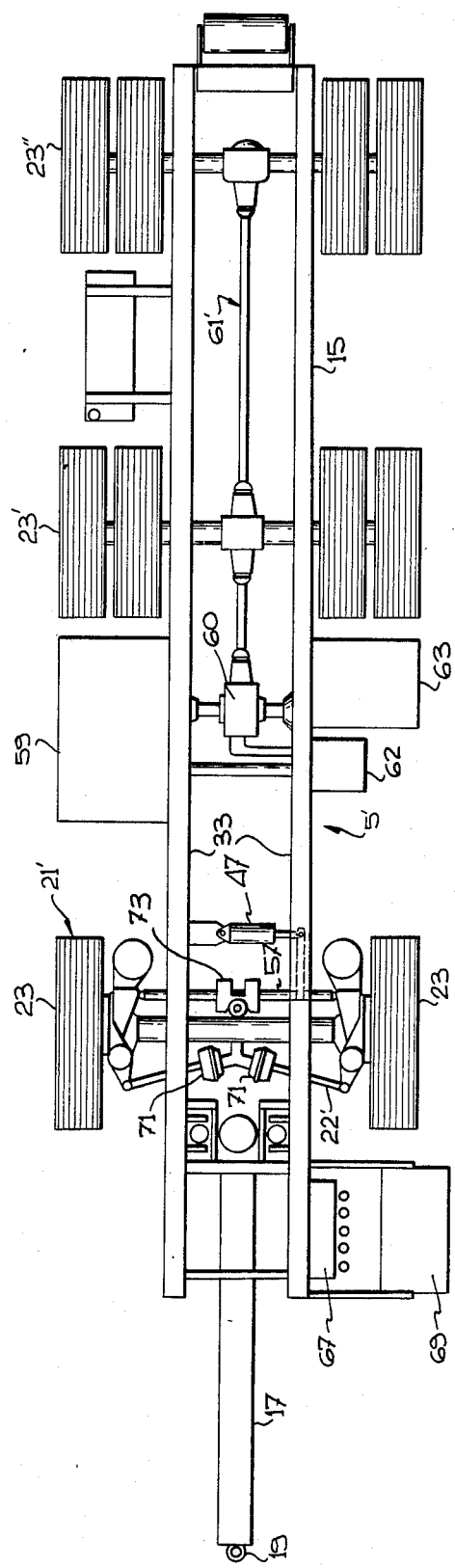
FIG. 11 is a top plan view, similar to that of FIG. 6, of another embodiment of the invention.

In the trailer embodiment illustrated in FIG. 11, the same type of device is used for moving the front end of the trailer 5' vertically for engagement and release of the hitching members 13, 19. In this case, however, it is the rear wheel bogies 23', 23", that are powered by being connected to the hydraulic motor 60 actuated by the pump 62 driven by the engine 59 and coupled by the conventional transmission 61'. The front auxiliary wheel bogie 21' is steerable in a similar manner to bogie 21 of FIG. 6 and has freely rotatable wheels 23. The axle structure 22' interconnecting the wheels 23 may be of a conventional type allowing for limited directional orientation of the wheels 23 when undertaking curves, through air damper assemblies 71, as well as providing an air-operated back-up lock device 73 preventing wheel rotation in reverse direction. The trailer 5' may thus remain ground-engaging when hitched to the truck. It should also be noted that the axle structure 22' is mounted for vertical displacement thereof on the trailer chassis 15 by exactly the same oscillation mechanism (not shown in FIG. 11) as that described above and shown in FIGS. 6 and 7, that is including the oscillating levers 31 and jacks 41. Thus, bogie 21' is a known unidirectional free-wheeling bogie with limited wheel oscillation, in the direction of travel, absorbed by damper assemblies 71 and it has a back-up lock 73.

With reference now to the embodiment shown in FIGS. 7 to 10, it will be seen that the load hauling tandem combination comprises an assembly 75 for slidably mounting and removing a load box on the trailer chassis 15. It comprises a frame platform 77 (FIG. 9) made up of a pair of spaced parallel elongated side members 79 (FIG. 10) interconnected at their ends by cross members 81 so as to form a rigid frame. Located short of the rearward end of the frame platform 77 is a pair of downwardly projecting brackets 83, solid with the side members 79, a shaft 85 extending through these two brackets as well as through the side members 79, the mounting being such as to allow oscillation of the load box mounting and removing assembly 75 about an axis 87 (FIG. 9) extending transversely of the assembly 75.

A pulley block mechanism is mounted between the side members and includes an hauling cable 89, with a hook 91 at one end, for drawing the load box onto the platform 77. The cable 89 winds around three sheaves 93, 95, 97, two of which 93, 95, are mounted for free rotation on a plate 99 of which the edges are mouCted for slidable displacement in slots created by U-shaped channels 101 (FIG. 10) secured on the webs of the side members 79. Plate 99 is slit lengthwise at 103 and parallel spaced flanges 105 upstand from the edges of the slit 103, being solid with the plate 99. The sheave 93 has a pair of stub axles 107 mounted for free rotation in appropriate apertures through the flanges 105, as clearly shown in FIG. 10. The sheave 95, at the rear of the sheave 93, is likewise mounted for free rotation on the upstanding flanges 105.

As to sheave 97, it is mounted for free rotation in a manner similar to sheaves 93 and 95 but on a plate 109 which is secured to and across the side members 77, along the lower edge thereof as shown in FIG. 8. Forwardly of the sheave 97 and on the same plate 109, there is provided a hook 111 of any conventional type for the releasable fixing of the other end of the hauling cable 89. Slidable displacement, forward and rearward, of the plate 99 is obtained by a pair of hydraulic or pneumatic jacks 113 of which the forward end of the rods 115 are secured, in any known manner, to the rearward edge of the slidable plate 99. The rearward ends of the cylinder part of the jacks 113 have brackets 116 through which extends an axle 117 mounted on the side membes 79 and across the frame platform 77.

Figure 10:
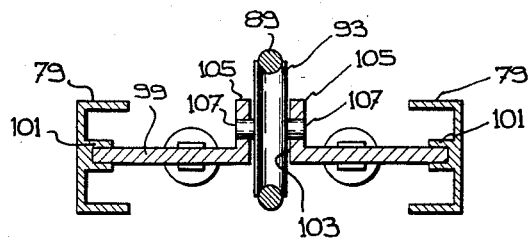
FIG. 10 is a transverse cross-sectional view in a plane along line X—X of FIG. 8.

As will readily be gathered from the above description and the illustration of FIGS. 8, 9 and 10, movement of the rods 115 out of their corresponding jack cylinders will cause forward movement of the plate 99 and, because of the successive winding of the cable 89 around the sheaves 93, 95, 97, rapid movement forward of the hook 91 and of the load box that may be attached thereto.

FIG. 7 shows an additional power jack 119 of which the lower end of the cylinder portion has a bracket 121 through which extends an axle 123 mounted on the chassis 15, in any known manner, to allow oscillation of the jack 119 about the longitudinal axis of the axle 123. The jack 119 is of the multi-cylinder telescopic type and has a rod 125 of which the free end is pivotally mounted on a bridge 128 extending between and being secured to the upper end of a pair of spaced plates 129 upstanding from the forward end of the platform 77. This jack 119 serves of course to raise and lower the platform 75 when it is desired to load or unload the material containing box.

As shown in FIG. 7, a roller 131 is preferably provided rearwardly of the tiltable rear axle bogie 65 and platform shaft 85, being fixed for rotation in any known manner to the rear end of the chassis 15. This roller 131 serves to prevent any tipping of the chassis 15 during loading or unloading of the load box.

Figure 12:
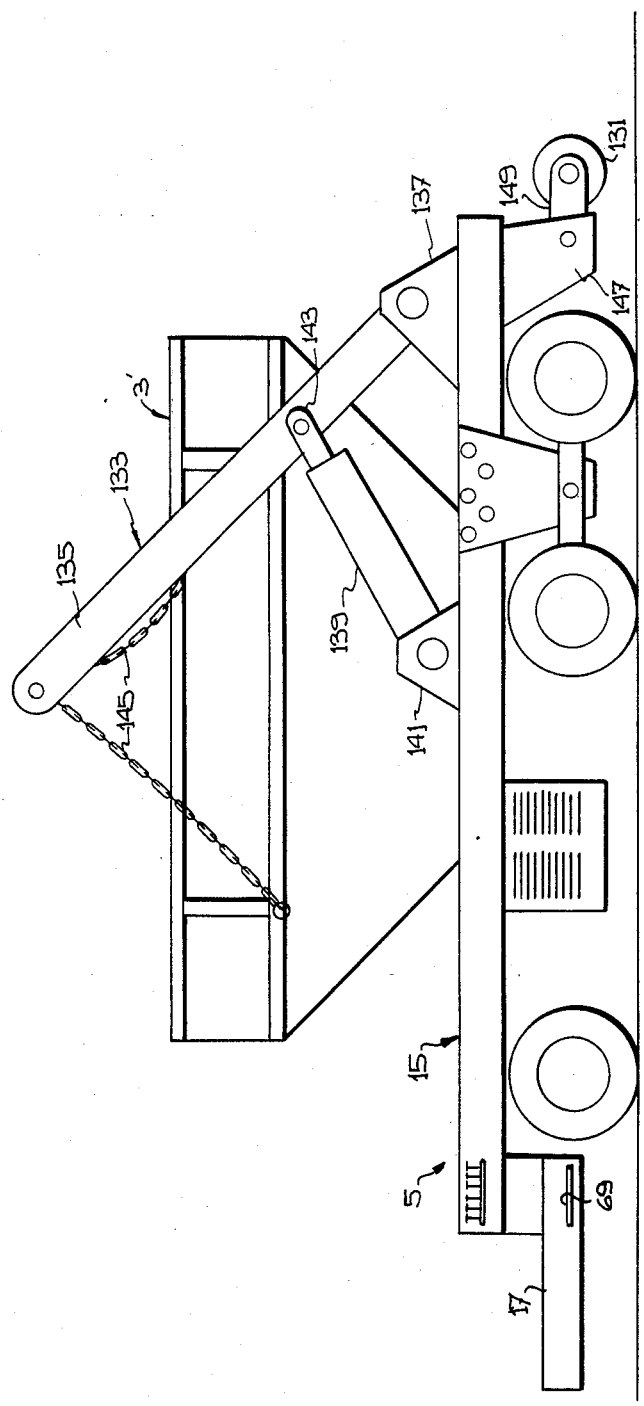
FIGS. 12 and 13 are side elevation views of two trailers each provided with at least one load box and a pair of lifting mechanisms suitable to lift the box or boxes on and off the trailer.
Figure 13:
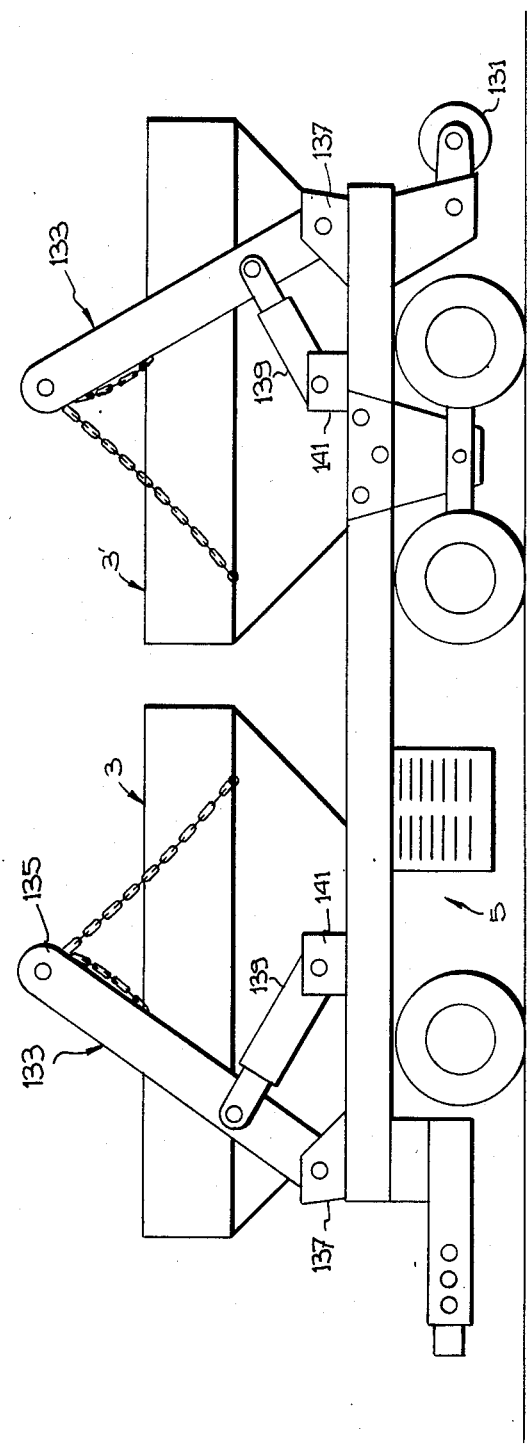

With reference to FIGS. 12 and 13, it will be seen that the trailer 5 is provided, in FIG. 12, with one load box 3' and, in FIG. 13, with two such load boxes 3' of identical construction. Each load box 3' is lifted on and off the trailer 5 by a pair of lifting means 133 each located on one side of a box 3'

Each such lifting means 133 comprises a boom 135 wich is mounted for pivotal movement about an axis transverse to the trailer 15 on a bracket 137 which upstands from the frame of the trailer 15. Boom 135 is pivoted by means of a hydraulic or pneumatic power jack 139 of which the cylinder end is pivotally mounted on a bracket 141 while its rod 143 has the free end thereof pivoted to the boom 135, intermediate the ends of the latter. The pivot axes of the two ends of the jacks 139 are of course parallel to that of the lower end of the boom 135, that is axes transverse to the chassis 15.

For each boom 135 of each lifting means 133, there is provided a pair of chains 145 of which one end is connected at the upper end of the boom 135 and the other end to two points of the load box 3' such that clockwise movement of the boom 135 will lift the box 3' and hold it in equilibrium so that it may safely be moved from the trailer 15 to the ground and from the ground on the trailer 15, as will easily be gathered.

As with the embodiment of FIG. 7, the trailer 5 may advantageously be provided with an anti-tipping roller 131 mounted on the chassis 15 by means of a pair of brackets 147 and through arms 149 provided with suitable mechanisms to allow vertical pivoting of the roller 131 with respect to the ground, to adjust the distance therefrom.

Still with respect to the trailers of FIGS. 12 and 13, it will also be appreciated that the forward wheel bogie may be of the powered steerable type as that of FIG. 6 or of the unidirectional free wheeling type of FIG. 11 with limited directional oscillation. Similarly, the rear wheel bogie may be of any known conventional type.

We claim:
1. In a load hauling tandem combination of the type comprising:
    a motor driven truck having a chassis;
    a wheel-mounted trailer having a chassis;
    means on both of said truck and said trailer for hitching and unhitching said truck and trailer to and from each other;
    motor means on said trailer for driving said trailer independently of said truck when unhitched therefrom;
    steering means on said trailer for steering said trailer when unhitched from said truck, and
    means on said trailer for mounting and removing a load box on and from said trailer chassis,
    the improvement wherein said hitching means comprise:
    a truck hitching member solid with the rear end of the truck chassis;
    a trailer hitching member solid with the front end of the trailer chassis, said trailer hitching member cooperating with said truck hitching member, by vertical displacement of said trailer hitching member relative to said truck hitching member, to hitch said truck and trailer in tandem formation and to unhitch said trailer from said truck; and
    means at the front end of said trailer for vertically displacing said trailer front end to allow said hitching and unhitching of said truck and trailer hitching member, said means for vertically displacing said trailer front end comprising:
    a forward wheel bogie comprising an axle structure, a pair of steering wheels and joint means for mounting said steering wheels at the ends of the axle structure in such a manner that said wheels are steerable independently of said axle structure, said steering wheels forming part of the steering means of the trailer and being steerable therefrom;
    means for mounting the forward wheel bogie under the trailer chassis, said mounting means allowing vertical displacement of the trailer chassis and the forward wheel bogie with respect to each other; and
    power jack means mounted between the trailer chassis and the forward wheel bogie to vertically dis- place said trailer chassis and said forward wheel bogie with respect to each other;

a pair of parallel oscillating levers beneath said trailer chassis and extending lengthwise thereof, said levers each having a front end and a rear end;

means mounting the axle structure of the forward wheel bogie on said levers, intermediate the ends of said levers and with said axle structure extending transversely of said levers and of said trailer chassis; and means mounting said rear ends of said levers on said chassis for oscillating movement of said levers about an axis extending transversely of said trailer chassis;

said power jack means mounted on the trailer chassis including jack rods connected to said front ends of said levers for oscillating said levers and said forward wheel bogie about said lever oscillating transverse axis.

2. The improved combination of claim 1, wherein said trailer motor means comprise an engine and a transmission operatively connecting said engine to said axle structure and said wheels of said forward wheel bogie to transfer rotary power to said wheels.

3. The improved combination of claim 1, wherein said trailer has at least one rear wheel bogie and said trailer motor means comprise an engine and a transmission operatively connecting said engine to said rear wheel bogie to transfer rotary power to the wheels of said rear wheel bogie.

4. The improved combination as claimed in claim 1, wherein said means for mounting and removing a load box on and from said trailer chassis, comprise:

a platform having a pair of spaced parallel elongated side members interconnected at the ends by crossmembers to form a rigid frame having a front end and a rear end;

means mounting said platform on said chassis or pivotal movement thereof about an axis transverse to said chassis and located short of said rear end of said platform;

pulley block means mounted between said side members and including a hauling cable for slidably drawing the said load box onto said platform, and a power jack for pivoting said platform and having one end pivotally connected to said front end of said platform and the other end pivotally connected to the front end of said trailer chassis.

5. The improved combination of claim 4, wherein said platform side members are formed with plate guiding slots turned toward one another and wherein said pulley block means comprises: a plate slidable in said slots; sheaves for said hauling cable mounted for free rotation on said plate and between said platform side members, and a pair of power jacks, for displacing said plate, said jacks having one end mounted on said plate and the other end on said platform, between said side members.

6. The improved combination of claim 1, wherein said means for mounting and removing a load box on and from the trailer chassis comprise a pair of lifting means, each on one side of said load box, to lift said load box on and off said trailer, each of said lifting means comprising:

a boom and means mounting one end of said boom on said trailer chassis for pivotal movement abut a first axis transversely to said trailer chassis;

a power jack and means mounting one end of said jack for pivotal movement about a second axis transverse to said trailer chassis and spaced from said first axis, and further means pivotally mounting the other end of said power jack to said boom, intermediate the ends thereof, for oscillating said boom about said first axis, and a pair of chains secured at one end to the other end of said boom and at the other ends to spaced points on said load box.

7. The improved combination of claim 6, comprising a pair of load boxes and an additional pair of lifting means, said two pairs of lifting means lifting said pair of boxes, respectively.

8. The improved combination of claim 1, wherein said truck hitching member is an upwardly turned hook and said trailer hitching member is a ring capable of fitting around said hook.

9. In a wheel mounted trailer, said trailer comprising;

a chassis;

means for hitching and unhitching said trailer to and from a truck or any similar vehicle;

motor means for driving said trailer independently when said trailer is unhitched;

steering means for steering said trailer when said trailer is unhitched; and means for mounting and removing a load box on and from said chassis, the improvement wherein said hitching means comprise:

a hitching member solid with the front end of the trailer chassis, and means at the front end of the trailer for vertically displacing said trailer front end to allow hitching and unhitching of said hitching member, said means for vertically displacing said trailer front end comprising;

a forward wheel bogie comprising an axle structure, a pair of steering wheels and joint means for mounting said steering wheels at the ends of the axle structure in such a manner that said wheels are steerable independently of said axle structure, said steering wheels forming part of the steering means of the trailer and being steerable therefrom;

means for mounting the forward wheel bogie under the trailer chassis, said mounting means allowing vertical displacement of the trailer chassis and the forward wheel bogie with respect to each other, and power jack means mounted between the trailer chassis and the forward wheel bogie to vertically displace said trailer chassis and said forward wheel bogie with respect to each other;

said means for mounting the forward wheel bogie under the trailer chassis comprise:

a pair of parallel oscillating levers beneath said trailer chassis, said levers extending lengthwise of said trailer chassis and each having a front end and a rear end;

means for mounting the axle structure of the forward wheel bogie on the levers, intermediate the ends of said levers and with said axle structure extending transversely of said levers and of said trailer chassis; and means for mounting the rear ends of said levers on the trailer chassis for oscillating movement of said levers about an axis extending transversely of said trailer chassis;

said power jack means mounted on the trailer chassis including jack rods connected to the front ends of the levers for oscillating said levers and said forward wheel bogie about said lever oscillating transverse axis.

10. The improved combination of claim 9, wherein the trailer motor means comprise an engine and a transmission operatively connecting said engine to the axle structure and wheels bogie to transfer rotary power to said wheels.

11. The improved trailer of claim 9, wherein said trailer has at least one rear wheel bogie and said trailer motor means comprise an engine and a transmission operatively connecting said engine to said rear wheel bogie to transfer rotary power to the wheels of said rear wheel bogie.

12. The improved trailer of claim 9, wherein said means for mounting and removing a load box on and from the trailer chassis, comprise:
 a platform having a pair of spaced parallel elongated side members interconnected at the ends by crossmembers to form a rigid frame having a front end and a rear end;
 means for mounting said platform on the chassis of the trailer for pivotal movement thereof about an axis transverse to said chassis and located short of the rear end of said platform;
 pulley block means mounted between the side members of the platform and including a hauling cable for slidably drawing the load box onto said platform, and
 a power jack for pivoting said platform, said jack having one end pivotally connected to the front end of the platform and the other end pivotally connected to the front end of the trailer chassis.

13. The improved trailer of claim 12, wherein said platform side members are formed with plate guiding slots turned toward one another and wherein said pulley block means comprise:
 a plate slidable in said slots;
 sheaves for said hauling cable mounted for free rotation of said plate and between said platform side members; and
 a pair of power jacks for displacing said plate, said jacks having one end mounted on the plate and the other end on the platform between the side members.

14. The improved trailer of claim 9, wherein said means for mounting and removing a load box on and from the trailer chassis comprise a pair of lifting means, each on one side of the load box, to lift said load box on and off said trailer, each of said lifting means comprising:
 a boom and means for mounting one end of said boom on said trailer chassis for pivotal movement about a first axis transverse to said trailer chassis;
 a power jack and means for mounting one end of said jack for pivotal movement about a second axis transverse to said trailer chassis and spaced from said first axis, and further means pivotally mounting the other end of said power jack to said boom, intermediate the ends thereof, for oscillating said boom about said first axis, and
 a pair of chains secured at one end to the other end of said boom and at the other ends to spaced points on said load box.

15. The improved trailer of claim 14, comprising a pair of load boxes and an additional pair of lifting means, said two pairs of lifting means lifting said pair of boxes, respectively.

* * * * *